United States Patent
Summers et al.

(10) Patent No.: US 7,120,735 B1
(45) Date of Patent: Oct. 10, 2006

(54) APPLICATION LEVEL AUTOMATIC FORMAT OF REMOVABLE MEDIA

(75) Inventors: Dennis M. Summers, Port Orchard, WA (US); Mark A. Green, Berthoud, CO (US); Gregory P. Fry, Portland, OR (US); David A. Coleman, Silverdale, WA (US); Donald J. Mapes, Bremerton, WA (US)

(73) Assignee: Sonic Solutions, Inc., Novato, CA (US)

( * ) Notice: Subject to any disclaimer, the term of this patent is extended or adjusted under 35 U.S.C. 154(b) by 384 days.

(21) Appl. No.: 10/443,160

(22) Filed: May 21, 2003

Related U.S. Application Data

(63) Continuation-in-part of application No. 10/210,824, filed on Jul. 31, 2002.

(60) Provisional application No. 60/382,495, filed on May 21, 2002.

(51) Int. Cl.
  G06F 12/00 (2006.01)
  G11B 27/36 (2006.01)

(52) U.S. Cl. .................... 711/111; 711/154; 369/59.25

(58) Field of Classification Search ................ 719/322
  See application file for complete search history.

(56) References Cited

U.S. PATENT DOCUMENTS

| | | | |
|---|---|---|---|
| 6,134,204 A | 10/2000 | Taugher | |
| 6,172,955 B1 | 1/2001 | Hashimoto | |
| 6,449,686 B1 | 9/2002 | Frappier et al. | |
| 6,606,285 B1 | 8/2003 | Ijtsma et al. | |
| 6,813,648 B1 | 11/2004 | Perona et al. | |
| 6,904,008 B1* | 6/2005 | Kawashima et al. | 369/47.15 |
| 2002/0051019 A1* | 5/2002 | De Vorchik et al. | 345/835 |
| 2002/0080392 A1 | 6/2002 | Parvulescu et al. | |
| 2002/0138512 A1 | 9/2002 | Buresh et al. | |
| 2002/0159353 A1* | 10/2002 | Sasaki | 369/53.15 |
| 2002/0172123 A1 | 11/2002 | Ohmi | |
| 2003/0013951 A1 | 1/2003 | Stefanescu et al. | |

OTHER PUBLICATIONS

"File Handling in Windows 3.1," NOS : Certificate in Computer Applications, http://wwwnos.org/htm/os3.htm.*
"Windows 3.x," Wikipedia, http://en.wikipedia.org/wiki/Windows_3.x.*
Winzip Screen Shot, http://www.nos.org/htm/course.htm, "Operating Systems" link.*
XUpload 2.1 Programmer's Manual, http://www.aspupload.com/xupload/xmanual.htm, 2001.*
McFadden, Andy, "CD-Recordable FAQ—Section 1," www.cdrfaq.org/faq01.html#s1-8, 2001.*

(Continued)

*Primary Examiner*—Matthew Kim
*Assistant Examiner*—Shane M. Thomas
(74) *Attorney, Agent, or Firm*—Martine Penilla & Gencarella, LLP

(57) ABSTRACT

An invention is provided for automatically formatting removable media at the application level. The method includes intercepting a write request to write to removable media, and determining if the removable media is unformatted. When the removable media is unformatted, the removable media is automatically prepared for content. The write request is then provided to an operating system, which performs a write operation on the removable media. In one aspect, the method can determine whether the write request is directed to a supported drive, which is a drive within a predetermined set of supported drives. In this aspect, if the write request is not directed to a supported drive, the write request can be provided to the operating system without formatting the removable media.

16 Claims, 13 Drawing Sheets

OTHER PUBLICATIONS

"Introduction—Philips Intellectual Property & Standards," Philips, http://www.mt-rainier.org.*

Case, Loyd, "No More Floppies?," http://www.findarticles.com/p/articles/mi_zd4166/is_200212/ai_n9513770/print.*

"Microsoft PressPass—Fast Facts about Microsoft," Microsoft, 2004, www.microsoft.com/presspass/inside_ms.asp, pp. 4.

"Using and Configuring AutoPlay," Microsoft, 2004, http://msdn.microsft.com/library/default.asp?url=/library/en-us/shellcc/platform/shell/programmersguide/shell_basics/shell_basics_extending/autoplay/autoplay2k_using.asp.

"Preparing Hardware and Software for Use with AutoPlay," Microsoft, 2004, http://msdn.microsft.com/library/default.asp?url=/library/en-us/shellcc/platform/shell/programmersguide/shell_basics/shell_basics_extending/autoplay/autoplay2k_cookbook.asp.

"SuperDisk User's Guide," Imation, 1999, http://www.imation.com/assets/Global_Assets/Products/PDF/SuperDisk_intIDE_Uguide.pdf.

"New Enhanced Feature Make Nero the Ideal Choice for Casual and Advanced Users," Ahead Software, 2001, www.nero.com/en/631934507105692.html.

"Nero Burning ROM 5.5 Manual," Ahead Software, 2001, ftp://ftp6.nero.com/manual/NeroBurningRom_ENG.pdf.

"Break-down on How to Read the Nero Log File Sample 1," Ahead Software, Jun. 2002, ftp://ftp6.nero.com/Support_doc/PDFLogfiles/NeroLogFile1.pdf.

"Nero 5 Burning ROM: Brief Instructions," Ahead Software, 2001, ftp://ftp6.nero.com/quickstartmanual/NeroBurningRom_Quickstart_ENG.pdf.

MKFP, Panagiotis Christias, 1994, www.mcsr.olemiss.edu/cgi-bin/man-cgi?mkfp+1.

"Formatted and Unformatted Capacity," The PC Guide, Apr. 2001, www.pcguide.com/ref/fdd/formatCapacity-c.html.

"Floppy Disk Geometry," The PC Guide, Apr. 2001, www.pcguide.com/ref/fdd/mediaGeometry-c.html.

* cited by examiner

APPLICATION LEVEL AUTOMATIC FORMAT OF REMOVABLE MEDIA

CROSS REFERENCE TO RELATED APPLICATIONS

This application claims the benefit of U.S. Provisional Patent Application No. 60/382,495, filed on May 21, 2002, entitled "Automatic Format of Removable Media," which is incorporated herein by reference. This application is a continuation-in-part of U.S. patent application Ser. No. 10/210,824, filed on Jul. 31, 2002, and entitled "Automatic Format of Removable Media," which is incorporated herein by reference. This application is related to 1) U.S. patent application Ser. No. 10/143,285, filed on May 9, 2002, entitled "Method and Apparatus for Formatting and Initialization of Rewritable Optical Media," 2) U.S. patent application Ser. No. 10/193,422, filed Jul. 10, 2002, entitled "Method and Apparatus for Formatting and Initialization of Re-Writable Optical Media Using Multiple Tracks," and 3) U.S. patent application Ser. No. 10/340,175, filed Jan. 9, 2003, entitled "Driver Based Automatic Format Of Removable Media," all of which are hereby incorporated by reference.

BACKGROUND OF THE INVENTION

1. Field of the Invention

This invention relates generally to computer readable removable media management, and more particularly to automatic preparation of computer readable removable media for content.

2. Description of the Related Art

Currently, computer readable removable media, such as floppy disks, CDs, and DVDs, requires preparation before being capable of storing data. This preparation generally takes the form of formatting the removable media. Broadly speaking, formatting organizes and divides the media into pieces that can be controlled for convenient storage and access. For example, a disk may be formatted into sectors, tracks, and clusters, which can be accessed via the operating system.

Although floppy disks generally are available preformatted, most other computer readable removable media, such as optical media, still require the user to perform a manual format. For example, FIG. 1 is a flowchart showing a method 100 conventionally used to prepare removable media for accepting data. In an initial operation 102, pre-process operations are performed. Preprocess operations can include, for example, selecting an appropriate storage media, preparing data to write to the storage media, and other preprocess operations that will be apparent to those skilled in the art.

In operation 104, the user inserts the unformatted media into the appropriate drive. For example, when writing a large amount of data, a user can select a blank, unformatted CD and insert the unformatted CD into the CD drive. Upon closing the drive, and with appropriate CD management software installed, the computer system generally will recognize the CD is unformatted and prompt the user to format the CD.

In operation 106, the user selects a format type and manually formats the removable media. For example, FIG. 2 illustrates an exemplary conventional CD format utility 200. The conventional CD format utility 200 includes an information window 202, a CD status window 204, a plurality of function buttons 206–212, a format button 214, and an eject button 216. In operation, the status of the CD is shown in the status window 204. For example, the status window 204 can show the type of CD inserted into the CD drive, and the amount of free space left on the CD. The user can utilize the option button 208 to select an appropriate format type for the CD. Once the type of format is selected, or default set, the format button 214 can be used to format the CD.

In another example, a user can select a format button on the main screen and be presented with a dialog box containing various formatting choices. The user then selects a format type, clicks the Start Format button, and formatting commences. After a period of time the CD formatting operation will be complete and the user will be informed of the format status in the information window 202.

Referring back to FIG. 1, once the user has formatted the media, the user can write data to the media, in operation 108. Generally, a user will write to the media using a drag and drop method, or cut and paste method. When using a drag and drop method, the user selects a file using the mouse cursor and the left or right mouse button. While keeping the mouse button depressed, the user drags the icon for the file to the drive icon for the media or an open window for the drive. When the user releases the mouse button the file is written to the formatted media in the drive.

Optionally, the operating system may allow the user to select how the data is written to the media. For example, the user may be able to select whether the data should be moved to the removable media (and erased from its current location) or only copied to the removable media. Post process operations are performed in operation 110. Post process operations can include updating directory viewing applications to show the newly copied data on the media, and other post process operations that will be apparent to those skilled in the art.

Unfortunately, many new computer users are unfamiliar with formatting requirements. As such, users may have difficulty in selecting an appropriate type of format for a particular removable media, or may not format the media before attempting to write to the unformatted media. As a result, many users experience errors, data loss, and frustration when using unformatted computer readable removable media.

In view of the foregoing, there is a need for systems and methods for allowing a user to utilize blank unformatted removable media without manually formatting the media. The methods should allow users to access and use removable media, such as CDs and DVDs, in a manner similar to using pre-formatted removable media, such as pre-formatted floppy disks.

SUMMARY OF THE INVENTION

Broadly speaking, embodiments of the present invention address these needs by providing an application level automatic formatting technique for automatically preparing removable media for content. Embodiments of the present invention allow users to access and use unformatted removable media in a manner similar to that used when accessing and using pre-formatted removable media. In one embodiment, a method for automatically formatting removable media is disclosed. The method includes intercepting a write request to write to removable media, and determining if the removable media is unformatted. When the removable media is unformatted, the removable media is automatically prepared for content. The write request is then provided to an operating system that performs a write operation on the removable media. In one aspect, the method can determine whether the write request is directed to a supported drive, which is a drive within a predetermined set of supported drives. In this aspect, if the write request is not directed to a supported drive, the write request can be provided to the operating system without formatting the removable media. In one aspect, to automatically format the removable media, a message is sent to a format application requesting the format application to format the removable media when the removable media is unformatted. Optionally, a drive type defining characteristics of the drive containing the removable media can be determined. In addition, a media type defining characteristics of the removable media present in the drive can be detected. In this manner, the removable media can be prepared for content based on the drive type, content type, and media type in response to receiving a request to write to the removable media. Removable media includes all types of media capable of storing computer readable data, such as compact discs, digital videodiscs, and floppy disks.

In an additional embodiment, a system is disclosed for automatically formatting removable media. The system includes a format application that is capable of automatically preparing removable media for content, and a shell extension that is in communication with the format application. The shell extension is capable of intercepting a write request to write to the removable media, and determining if the removable media is unformatted. Then, if the removable media is unformatted, the shell extension sends a format message requesting the format application to prepare the removable media for content. In one aspect, the shell extension provides the write request to an operating system once the removable media is formatted. The operating system then performs a write operation on the removable media based on the write request. In addition, the shell extension can be capable of determining whether the write request is directed to a supported drive. Also, the shell extension can provide the write request to the operating system without sending the format message to the format application if the write request is not directed to a supported drive. Similar to above, the format application can prepare the removable media for content based on a drive type defining characteristics of a drive containing the removable media, and a media type defining characteristics of the removable media.

A computer program embodied on a computer readable medium for automatically formatting removable media is disclosed in a further embodiment of the present invention. The computer program includes program instructions that intercept a write request to write to removable media, and program instructions that determine if the removable media is unformatted. In addition, program instructions are included that automatically prepare the removable media for content when the removable media is unformatted. This is performed without user interaction. The computer program also includes program instructions that provide the write request to an operating system that thereafter performs a write operation on the removable media. Optionally, the computer program can include program instructions that determine whether the write request is directed to a supported drive, and program instructions that provide the write request the operating system without formatting the removable media if the write request is not directed to a supported drive. As above, the computer program can include program instructions that send a message to a format application requesting the format application to format the removable media when the removable media is unformatted. Program instructions can further be provided that prepare the removable media for content based on a drive type defining characteristics of a drive containing the removable media, and media type defining characteristics of the removable media.

Advantageously, embodiments of the present invention allow new unformatted media to be utilized in a manner similar to using preformatted media. That is, formatting is performed automatically, without user intervention, and generally without any indication to the user that the media is being formatted. Further, the embodiments of the present invention advantageously work regardless of the target file system for the media. For example embodiments of the present invention can be utilized when the target file system can be a universal disk format (UDF), an NT file system (NTFS), a file allocation table (FAT) based file system, or any other type of file system. In addition, the embodiments of the present invention can further be used with other background formatting methods, such as Mt. Rainier (EASYWRITE), DVD+RW, DVD-RW Restricted Overwrite, RWNow!, HP® Fast Format, and other background formatting methods. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for an application level automatic formatting system for automatically preparing removable media for content. Embodiments of the present invention allow users to access and use unformatted removable media in a manner similar to that used when accessing and using pre-formatted removable media. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

The majority of users of removable media generally do not have a preference as to the type of formatting performed on removable media they are using. For example, a typical user of a CD-R generally is not concerned with how the CD-R is formatted. This user typically wishes to write and read files to and from the CD-R, regardless of the manner in which the CD-R is prepared. Hence, embodiments of the present invention automatically prepare removable media for content. For example, using the embodiments of the present invention, a user can write to an unformatted CD-R without manually formatting the CD-R prior to writing to the disc. That is, the embodiments of the present invention automatically prepare the disc for content. In particular, embodiments of the present invention intelligently select an appropriate format type for removable media in a drive, and as the user attempts to save files to the media, embodiments of the preset invention automatically format the media prior to writing the data to the media.

Figure 1:
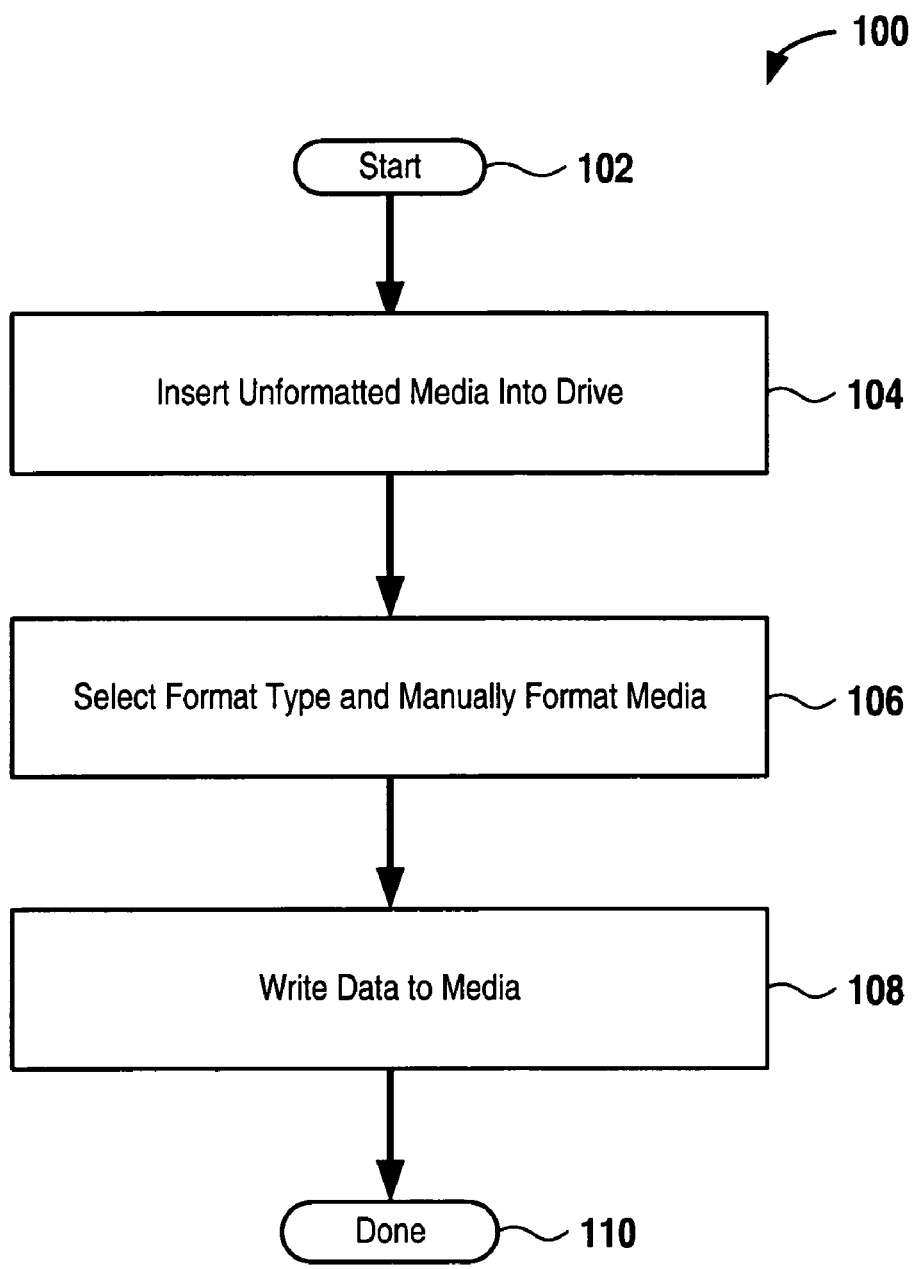
FIG. 1 is a flowchart showing a method conventionally used to prepare removable media for accepting data.
Figure 2:
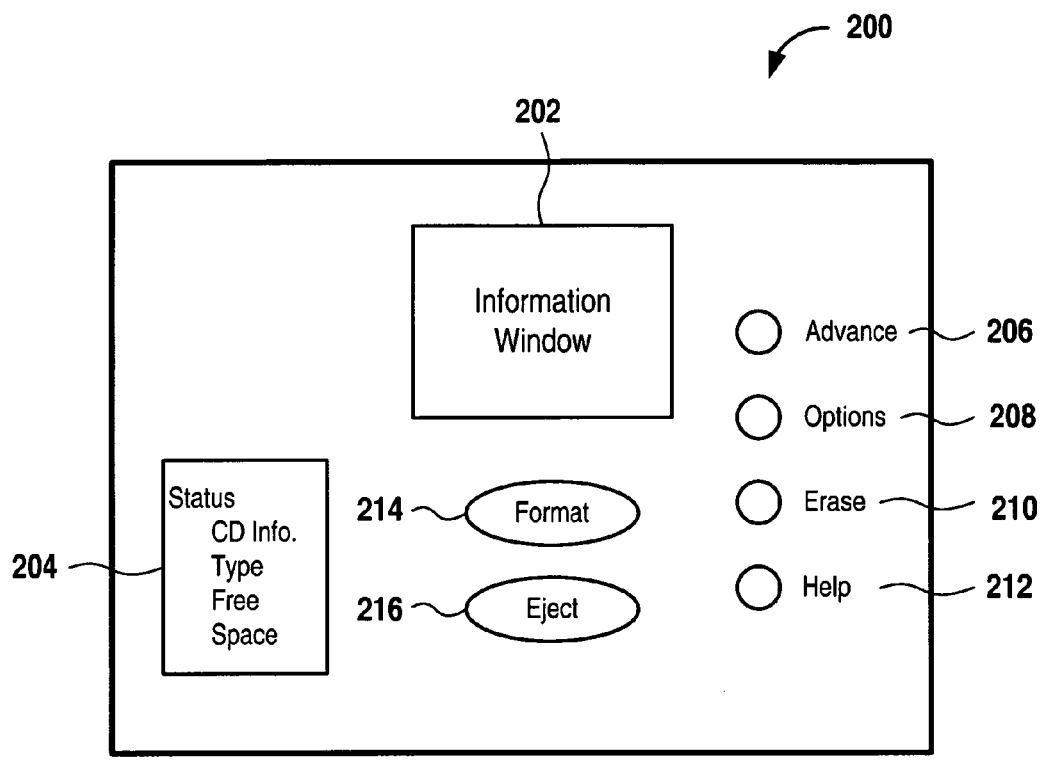
FIG. 2 illustrates an exemplary conventional CD format utility.
Figure 3:
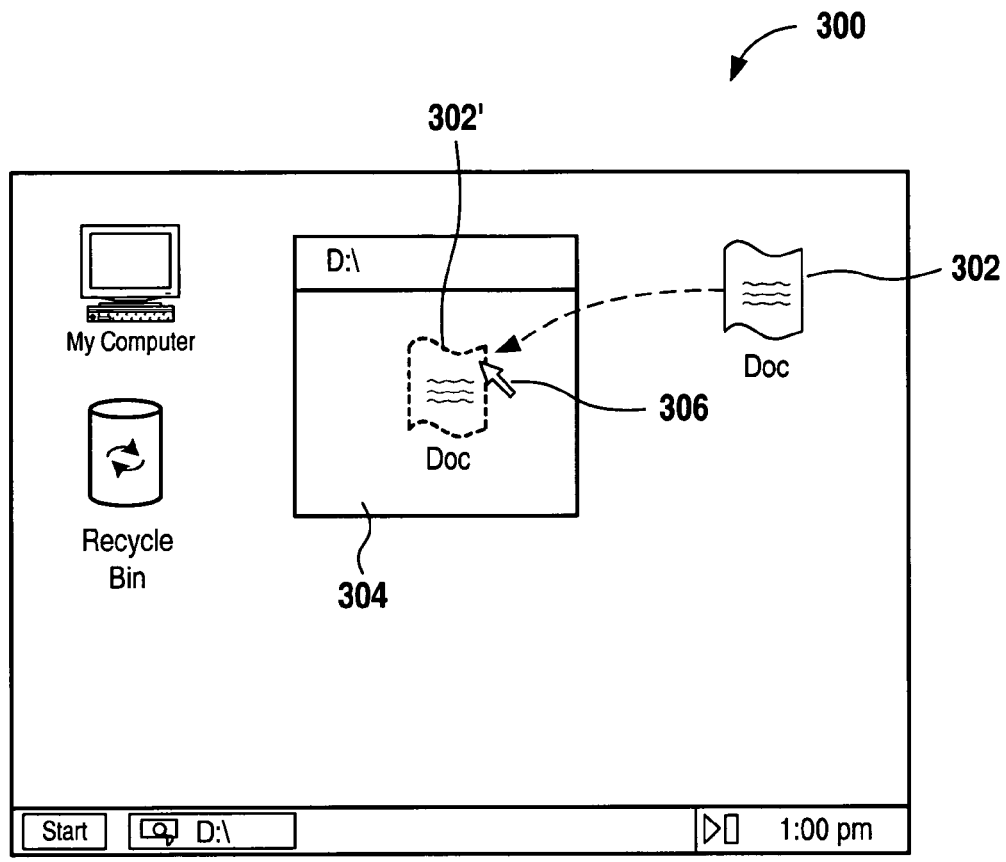
FIG. 3 illustrates an exemplary computer screen view showing a user initiated save to an unformatted removable media, in accordance with an embodiment of the present invention.

FIG. 3 illustrates an exemplary computer screen view showing a user initiated save to an unformatted removable media, in accordance with an embodiment of the present invention. FIG. 3 illustrates the ease with which a user can utilize unformatted removable media via the embodiments of the present invention. Hence, a user can open a window 304 to a drive having unformatted removable media. For example, in FIG. 3, the user can open a window to a CD-R/RW drive containing an unformatted CD-R. In addition, the user can select a file 302 to save to the media using the mouse cursor 306. Generally, to save the file to the media, the user drags the icon representing the file 302 to the window 304 and releases the mouse button.

At this point, embodiments of the present invention recognize the user is attempting to write to unformatted media, such as the unformatted CD-R. In response, the CD-R is formatted prior to performing the write operation. Advantageously, this format is performed automatically, without user intervention, and generally without any indication to the user that the CD is being formatted. Once the CD is formatted, the write operation is allowed to continue, and file 302' is written to the CD.

It should be noted that the user can write content to media in several different manners. For example, in FIG. 3, the user can select the icon representing the file 302 and press the right mouse button. In this case, a menu generally will appear that allows the user to select from several different operations related to the selected file 302. One of these operations can be a "send to" operation, which allows a user to select a particular drive on which to write the selected file 302. Other exemplary file writing techniques include using a Windows Explorer® program to transfer the file to the unformatted media, and "dragging" the file to a drive icon.

When using a Windows Explorer® program, for example, the user generally selects a folder having the file 302 from a list of folders displayed in a left frame of the Windows Explorer® user interface. The contents of the selected folder are then displayed in a right frame of the Windows Explorer® user interface. The user can "drag" the icon representing the file 302 from the right frame to the desired media drive icon in the left frame to save the file 302.

When "dragging" the file to a drive icon, the user selects a file 302 to save to the media using the mouse cursor 306. Then, to save the file to the media, the user drags the icon representing the file 302 to the drive icon and releases the mouse button. Other techniques for writing a file to removable media exist and are dependent on the operating system environment utilized by the computer system. As such, it should be appreciated that the embodiments of the present can be utilized in conjunction with any technique utilized to interact with removable media. For example, an application executing on the "desktop" can be the target of a drag-and-drop or cut-and-past operation, instead of Windows Explorer®. When a user drags files to the application, the media is formatted as above and then the files are copied to the disc, typically using the operating system to copy the files.

As mentioned above, several different types of formatting may be possible with any particular removable media. For example, a CD-RW can be, for example, formatted using a quick format, a full format, or one of several other format types. To determine the type of format to utilize when automatically formatting the removable media, embodiments of the present invention examine the media type, content type (file type), and state, and the corresponding drive.

Figure 4:
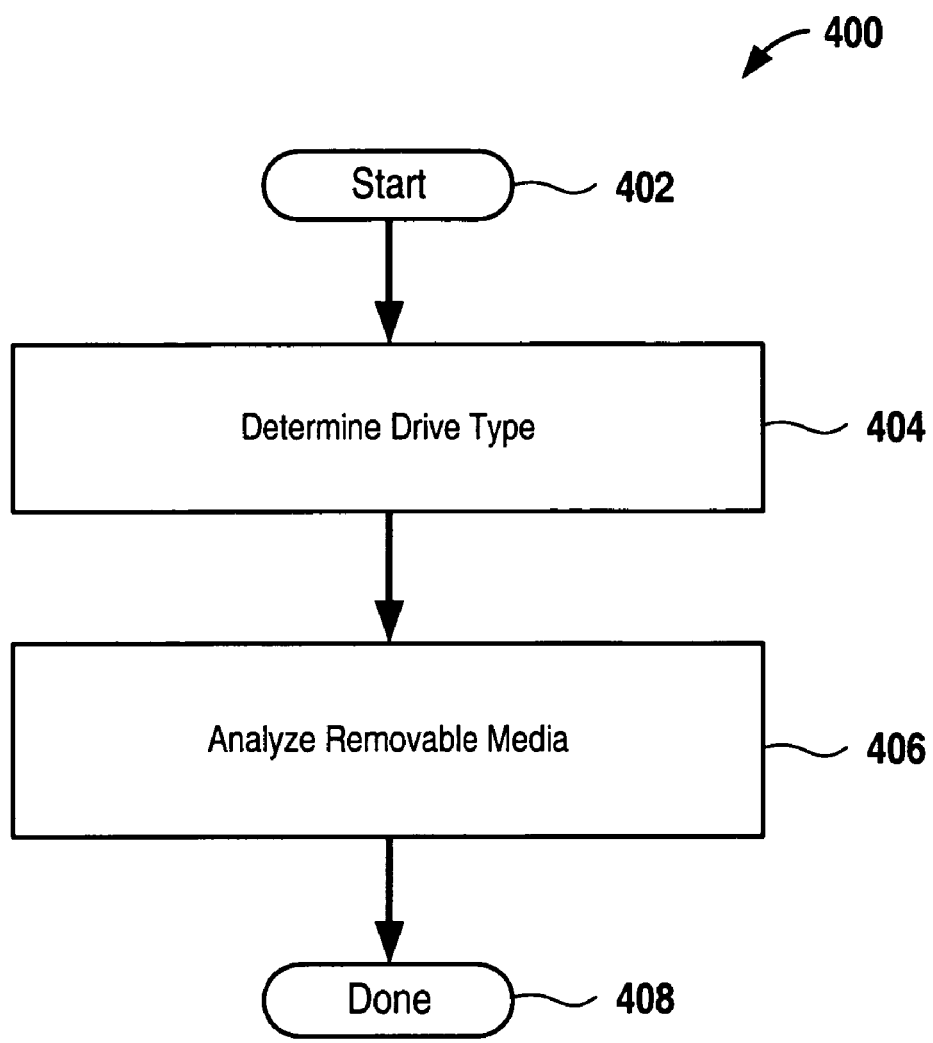
FIG. 4 is a flowchart showing a method for automatically determining an appropriate format type for a removable media, in accordance with an embodiment of the present invention.

FIG. 4 is a flowchart showing a method 400 for automatically determining an appropriate format type for a removable media, in accordance with an embodiment of the present invention. In operation 402, preprocess operations are performed. Preprocess operations can include, for example, determining the number and location of removable media drives in the system, sensing when new media is inserted in a drive, and other preprocess operations that will be apparent to those skilled in the art after a careful reading of the present disclosure.

Figure 5:
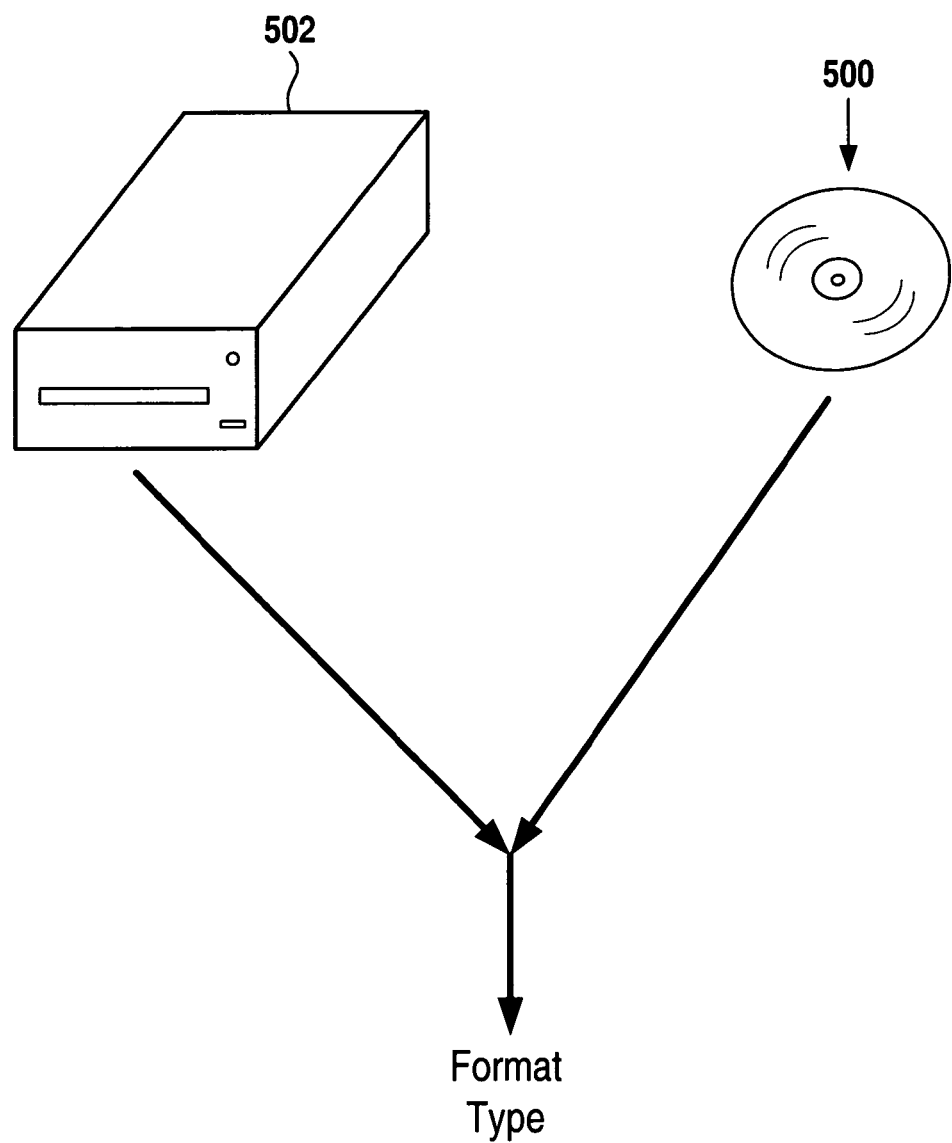
FIG. 5 is a diagram illustrating the sources utilized by the embodiments of the present invention to determine format type, in accordance with an embodiment of the present invention.

In operation 404, the drive containing the removable media is analyzed to determine the drive type. FIG. 5 is a diagram illustrating the sources utilized by the embodiments of the present invention to determine format type, in accordance with an embodiment of the present invention. As shown in FIG. 5, embodiments of the present invention examine the media 500 and the drive 502 containing the media 500 to determine format type. When examining the drive 502, embodiments of the present invention analyze the properties of the drive 502, such as the manufacturer and model number, to determine the capabilities of the drive 502.

Different drive types can have different capabilities, and thus, may support varying format types. For example, specific drives manufactured by Hewlett-Packard allow a format type called "fastformat," which provides fast formatting. Similarly, a Mount Rainier (or EasyWrite) Drive, for example, allows Mount Rainier (or EasyWrite) formatting, which performs an initial format then allows the user to interact with the drive while the remainder of the formatting continues. Other drive manufactures can support still further formatting types. Hence, the embodiments of the present invention examine the drive type to determine the format types supported by the drive.

Referring back to FIG. 4, the removable media present in the drive is analyzed, in operation 406. As shown in FIG. 5, and mentioned above, embodiments of the present invention examine the media 500 and the drive 502 containing the media 500 to determine format type. When examining the media 500, embodiments of the present invention determine the type of media and the state of the media. The type of media determines the format types that can be utilized to format the media. Embodiments of the present invention also can base the format type on the type of data being written to the media, in addition to the type and state of the actual media. For example, when the DVD movie data is being written to the media, embodiments of the present invention can format a DVD such that the DVD is capable of being played in a DVD player.

For example, a floppy disk can be formatted using different format types than are available when formatting a CD-R. In addition, the state of the media can influence the format type selected for the media. For example, a previously formatted CD-RW can be formatted using a quick format or a full format. The quick format does not erase the entire disc, but allows it to be overwritten during use, while a full format erases the entire disc, but generally requires additional time to perform. Once the format type is selected, the removable media can be formatted when the user attempts to interact with the media.

Turning back to FIG. 4, post process operations are performed in operation 408. Post process operations can include detecting when new media is inserted in the drive, allowing a user to manually format the media, formatting the media in response to receiving a user request to write to the media, and other post process operations that will be apparent to those skilled in the art after a careful reading of the present disclosure. Hence, by analyzing the drive and media, embodiments of the present invention can automatically format unformatted media without requiring user intervention, as described below with reference to FIG. 6.

Figure 6:
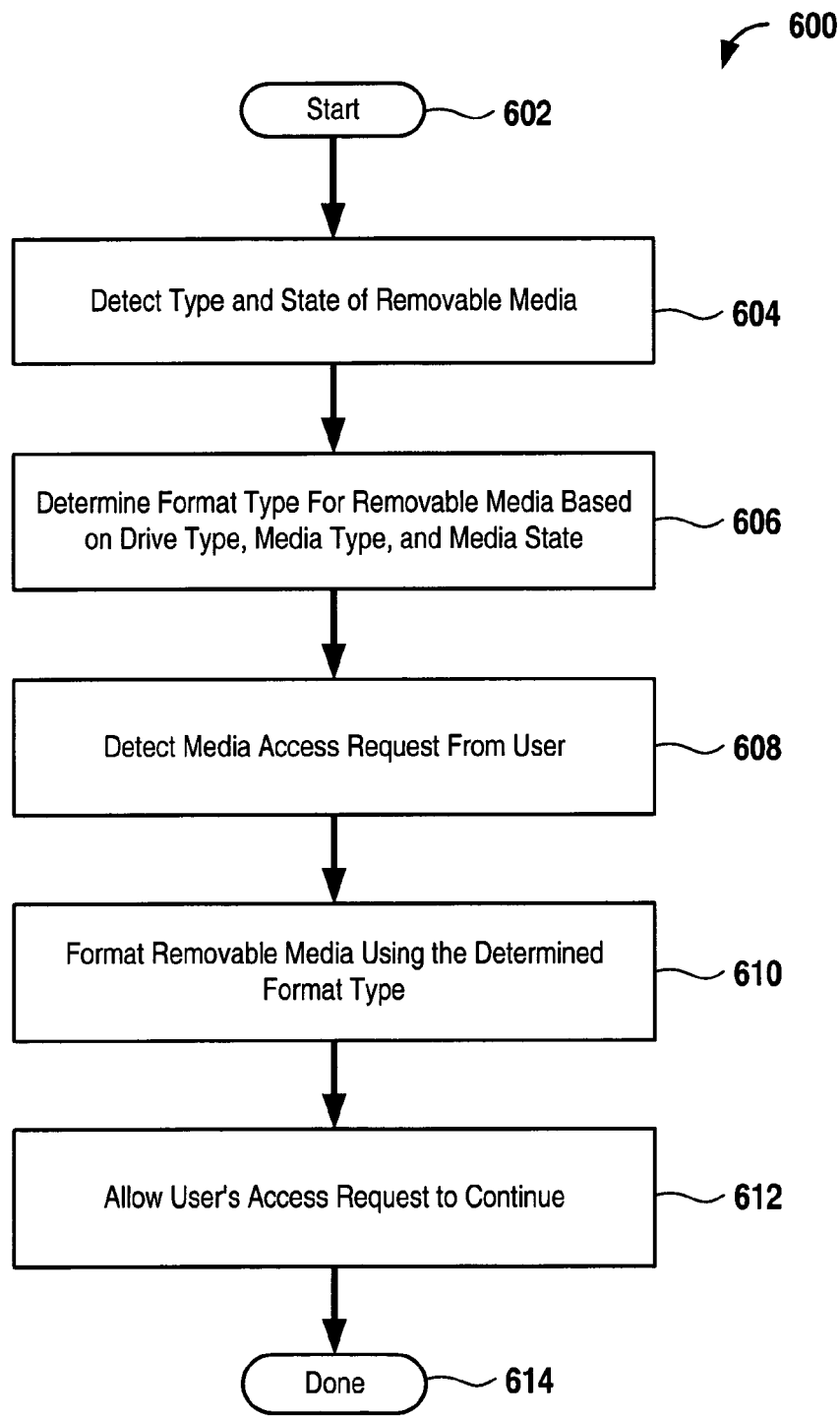
FIG. 6 is a flowchart showing a method for automatically preparing removable media for content, in accordance with an embodiment of the present invention.

FIG. 6 is a flowchart showing a method 600 for automatically preparing removable media for content, in accordance with an embodiment of the present invention. In an initial operation 602, preprocess operations are performed. Preprocess operations can include, for example, determining the drive type of the drive containing the removable media, detecting the presence of new removable media in the drive, and other preprocess operations that will be apparent to those skilled in the art after a careful reading of the present disclosure.

In operation 604, the type and state of the removable media is detected. As mentioned above, embodiments of the present invention examine the media and the drive containing the media to determine format type. When examining the media, embodiments of the present invention determine the type of media and the state of the media. As mentioned previously, the type of media determines the format types that can be utilized to format the media. In addition, the state of the media can influence the format type selected for the media. For example, a previously formatted CD-RW can be formatted using a quick format or a full format. The quick format does not erase the entire disc, but allows it to be overwritten during use, while a full format erases the entire disc, but generally requires additional time to perform.

Based on the drive type, media type, and media state, a format type is determined for the removable media, in operation 606. As will be described subsequently, embodiments of the present invention can prepare media for receiving content in response to a user's attempt to write to such media. To reduce the amount of processing required at the time of formatting, embodiments of the present invention can determine the type of format that will be used for a particular unformatted media in a particular drive prior to receiving a request to access the media. In this manner, the format type will be previously determined when the actual format is performed, thus saving time during the format operation. However, it should be noted that embodiments of the present invention are not limited to determining the format type prior to receiving a user request to access the media, and can thus determine the format type at any time prior to actually formatting the media.

For example, tables 1–3 below show exemplary format type selections based on the type of media and the type of drive. In particular, table 1 illustrates exemplary format type selections for unformatted media when used with a standard drive, and a Mount Rainier (EasyWrite) Drive.

TABLE 1

| Media | Standard Drive | Description | Background Format Method. |
|---|---|---|---|
| CD-R | Quick Format | File system written to disc | N/A |
| CD-RW | Quick Format as CD-R (optionally, the user can be warned of the wait time if it is long) | File system written to disc Drives can contain the ability to format in the background. | Mount Rainier Format |
| DVD-RAM | Quick Format | Block structure already on disc; file system written | N/A |
| DVD-R | Quick Format | Like CD-R; file system written to disc | N/A |
| DVD-RW | Quick Format | Drives contain the ability to simulate a built in background formatting, file system written to disc. | N/A |
| DVD+RW | Quick Format | Drives contain built-in background formatting; file system written to disc | Mount Rainier format |
| DVD+R | Like CD-R/DVD-R | | N/A |

Table 2 illustrates exemplary format type selections for previously written media when the media is mounted using software known by the developer, and when used with a standard drive, and a Mount Rainier Drive, in accordance with an embodiment of the present invention.

TABLE 2

| Media | Standard Drive | Description | Background Format Method. |
|---|---|---|---|
| CD-R | N/A | Can not re-format CD-R | N/A |
| CD-RW | Quick format | Do a quick format on previously written CD-RW. | Mount Rainier Format: if MR disc, do a quick MR format. If a mounted non-MR format, do a quick format. |
| DVD-RAM | Quick Format. | | N/A |
| DVD-R | N/A | Can't re-format DVD-R | N/A |
| DVD-RW | Quick format | Drives contain the ability to simulate a built in background formatting, file system written to disc. | N/A |

TABLE 2-continued

| Media | Standard Drive | Description | Background Format Method. |
|---|---|---|---|
| DVD+RW | Quick Format | Drives contain built-in background formatting; file system written to disc | Mount Rainier format if a MR disc, otherwise, full format. |
| DVD+R | N/A | Can't re-format DVD+R | N/A |

Table 3, below, illustrates exemplary format type selections for previously written media when the media is mounted using software unknown by the developer, and when used with a standard drive, and a Mount Rainier Drive, in accordance with an embodiment of the present invention.

TABLE 3

| Media | Standard Drive | Description | Background Format Method. |
|---|---|---|---|
| CD-R | N/A | Can't re-format CD-R | N/A |
| CD-RW | Full Format | Minimally blank the disc, do a full format. | Mount Rainier Format: if MR disc, do a quick MR format. If a mounted non-MR format, do a quick format. |
| DVD-RAM | Quick Format | Rewrites file system | N/A |
| DVD-R | N/A | Can't re-format DVD-R | N/A |
| DVD-RW | Quick Format | Drives contain the ability to simulate a built in background formatting, file system written to disc. | N/A |
| DVD+RW | Quick Format | Drives contain built-in background formatting; file system written to disc | Mount Rainier format if a MR disc, otherwise, full format. |
| DVD+R | N/A | Can't re-format DVD+R | N/A |

In operation 608, a media access request from the user is detected. As mentioned previously, a user can request access to media using a plurality of different techniques. For example, the user can select a file to save to the media using the mouse cursor. Then, drag the icon representing the file to the window for the drive while keeping the mouse button depressed. Finally, the user releases the mouse button to save the file to the media. In addition, the user can select the icon representing the file and press the right mouse button. In this case, a menu will generally appear that allows the user to select from several different operations related to the selected file. One of these operations can be a "send to" operation, which allows a user to select a particular drive one which to write the selected file, or the user can drag-and-drop or cut-and-paste files to the application.

Other exemplary file writing techniques include using a Windows Explorer® program to transfer the file to the unformatted media, and "dragging" the file to a drive icon. As discussed previously, when using a Windows Explorer® program, for example, the user generally selects a folder having the file from a list of folders displayed in a left frame of the Windows Explorer® user interface. The contents of the selected folder are then displayed in a right frame of the Windows Explorer® user interface. The user can "drag" the icon representing the file from the right frame to the desired media drive icon in the left frame to save the file.

When "dragging" the file to a drive icon, the user selects a file to save to the media using the mouse cursor, and drags the icon representing the file to the drive icon. The user then releases the mouse button to save the file to the media. Other techniques for writing a file to removable media exist and are dependent on the operating system environment utilized by the computer system. As such, it should be appreciated that the embodiments of the present can be utilized in conjunction with any technique utilized to interact with removable media.

Regardless of the technique the user utilizes to request access to the media, embodiments of the present invention can detect this request. For example, embodiments of the present invention can "listen" for a message that indicates a user is trying to access the media. In a further embodiment, drive access requests can be intercepted. Regardless of the manner in which the access request is detected, embodiments of the present invention format the removable media in response to detecting the media access request, as described in operation 610.

In operation 610, the removable media is formatted using the format type determined in operation 606. As mentioned above, embodiments of the present invention can utilize several formatting types to format a particular removable media as described above, with reference to Tables 1–3. For example, to reduce the amount of time required to format CD-RWs, embodiments can format CD-RWs using several techniques that reduce the formatting time. In one embodiment, for example, a CD-RW can be formatted as a CD-R, by performing a sequential format. In this case, the formatting time for the CD-RW is about that of a CD-R. Although, the versatility of the CD-RW can be reduced when formatted in this manner, the timesavings can compensate the lost versatility for some users.

In operation 612, the user's request to access the media is allowed to continue. Once the media has been formatted, in operation 610, the media can accept content. Thus, the user's request to access the media is allowed to continue as originally requested. For example, when a user drags a file to an unformatted CD-RW, embodiments of the present invention first automatically format the CD-RW, then allow the file to be written to the newly formatted disc. In this manner, the user can utilize unformatted removable media in a manner similar to using previously prepared and formatted removable media.

Post process operations are performed in operation 612. Post process operations can include, for example, detecting new media in the drive, selecting a new format type, and other post process operations that will be apparent to those skilled in the art after a careful reading of the present disclosure. In addition to preparing media for content based on the drive type, media type, and media state, embodiments of the present invention can also base the format type on the type of content being written to the media.

Embodiments of the present invention utilize a shell extension to intercept the operating system's Drag and Drop operations. Broadly speaking, upon examining the removable media and the drive containing the media, embodiments of the present invention format the removable media before the operating system is allowed to complete the Drag and Drop operation and copy the files to the removable media. As mentioned above, embodiments of the present invention format the removable media based upon the type of media and hardware that is being used (and optionally, the data type being written to the media), setting the format parameters to the best settings for the particular use of the media and speed of formatting. Optionally, the user can pre-setup formatting parameters, for example, sequential or random model UDF, FAT, NTFS, or ISO file systems.

Figure 7:
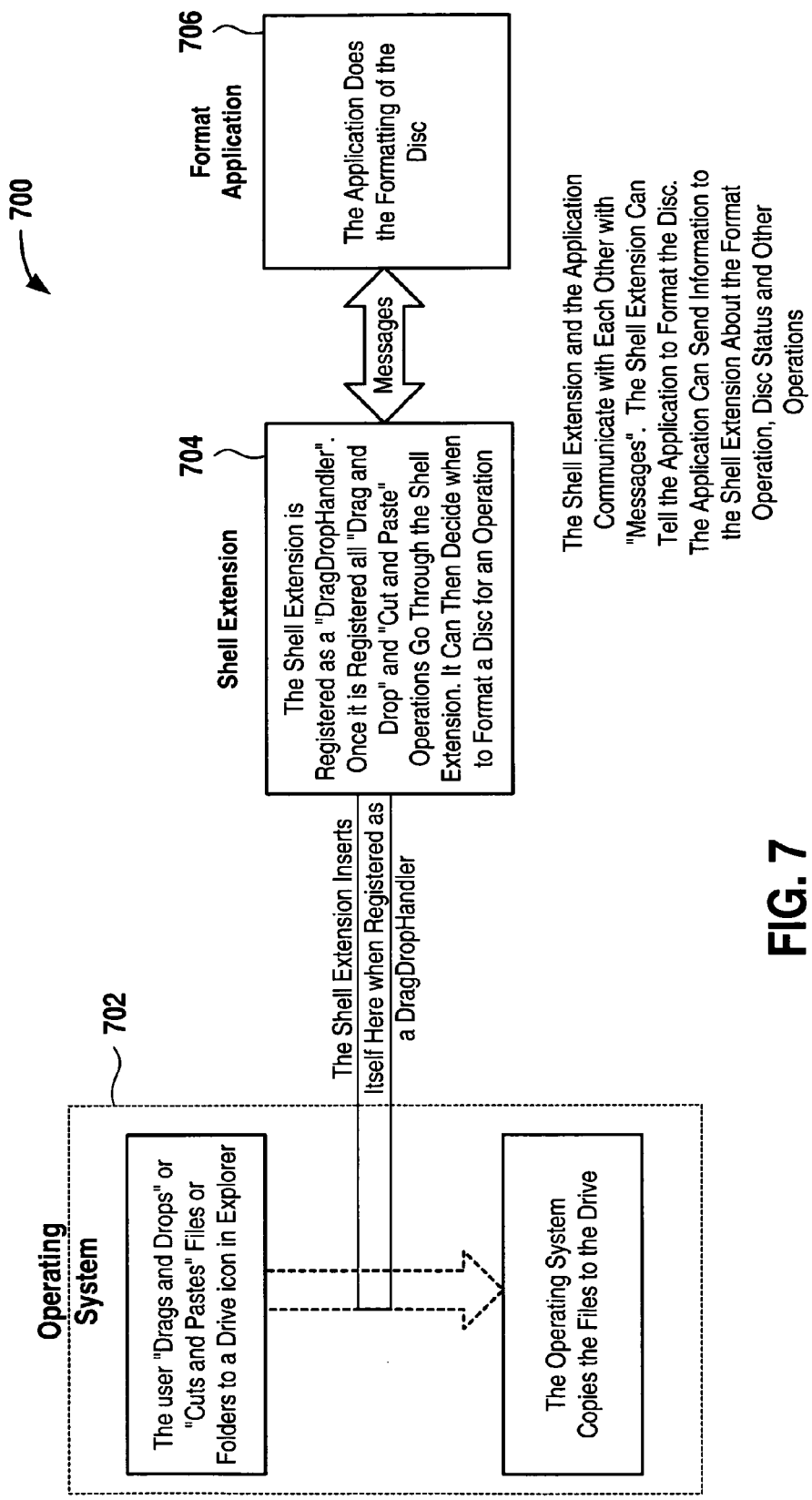
FIG. 7 is a block diagram showing a computer environment having automatic formatting functionality, in accordance with an embodiment of the present invention.

FIG. 7 is a block diagram showing a computer environment 700 having automatic formatting functionality, in accordance with an embodiment of the present invention. The computer environment 700 illustrates the relationship between an operating system 702, and the shell extension 704 and format application 706 of the embodiments of the present invention.

Using the embodiments of the present invention, users advantageously need not be intimidated with the task of formatting removable media. For example, the user does not need to know the different formatting types nor does the user need to make a decision as to what is the best way to format the removable media they want to use. As a result, embodiments of the present invention make copying files to blank removable media a quick one step process of "dropping" files on the drive icon, explorer window, an application, or a shortcut to the drive.

Using the operating system registry, embodiments of the present invention set themselves up as a "DragDrop Handler" with the operating system 702. This allows Drag and Drop operations to particular drives to be intercepted by the shell extension 704 of the embodiments of the present invention. For example, in a Windows® operating system, embodiments of the present invention create a shell extension 704, which functions as an extension to the Windows Explorer® program. The shell extension 704 allows functionality to be added to Windows Explorer®. Thus, the shell extension 704 allows operations occurring in Windows Explorer® to be intercepted and acted on in a particular manner. By registering the shell extension 704 as a Drag-Drop handler in the Windows® registry, the shell extension 704 gets notification of all Drag and Drop operations and Cut and Paste operations to particular drives that are performed using Windows Explorer®.

In general, when Drag and Drop or Cut and Paste message is intercepted, the message is examined to determine if it is destined for a drive under the control of the automatic formatting software of the embodiments of the present invention. If not, the message is allowed to continue to the operating system, which handles the message. If the message is destined for a drive under the control of the automatic formatting software, the removable media in the drive is examined to determine if the media is currently unformatted. If there is removable media in the drive, and the removable media is unformatted, the format application 706 formats the removable media.

Once a disk write operation, such as a Drag and Drop operation, has been intercepted by the shell extension 704 for a supported drive, the shell extension 704 calls the format application 706. The format application 706 examines the removable media to determine whether the removable media is completely erased or unformatted. Completely erased removable media may have been previously formatted, but currently has 'zeros' written to the entire media. It should be noted that unformatted removable media in some cases is different from removable media that has been completely erased. Optionally, the shell extension 704 can analyze the removable media itself to determine the format state using internal library functions, instead of calling the format application 706.

In one embodiment, a dialog box is displayed to the user when the shell extension 704 intercepts a Drag and Drop message. The dialog box informs the user that the removable media is being prepared, and during this time the format application 706 formats the removable media. Once formatted, the dialog box is removed and the Drag and Drop message is provided to the operating system 702, which performs Drag and Drop operation by copying the file to the removable media. In some circumstances, such as when the Drag and Drop operation will take several seconds to complete, the operating system 702 can display a second dialog box informing the user that the files are being copied to the removable media.

Figure 8A:
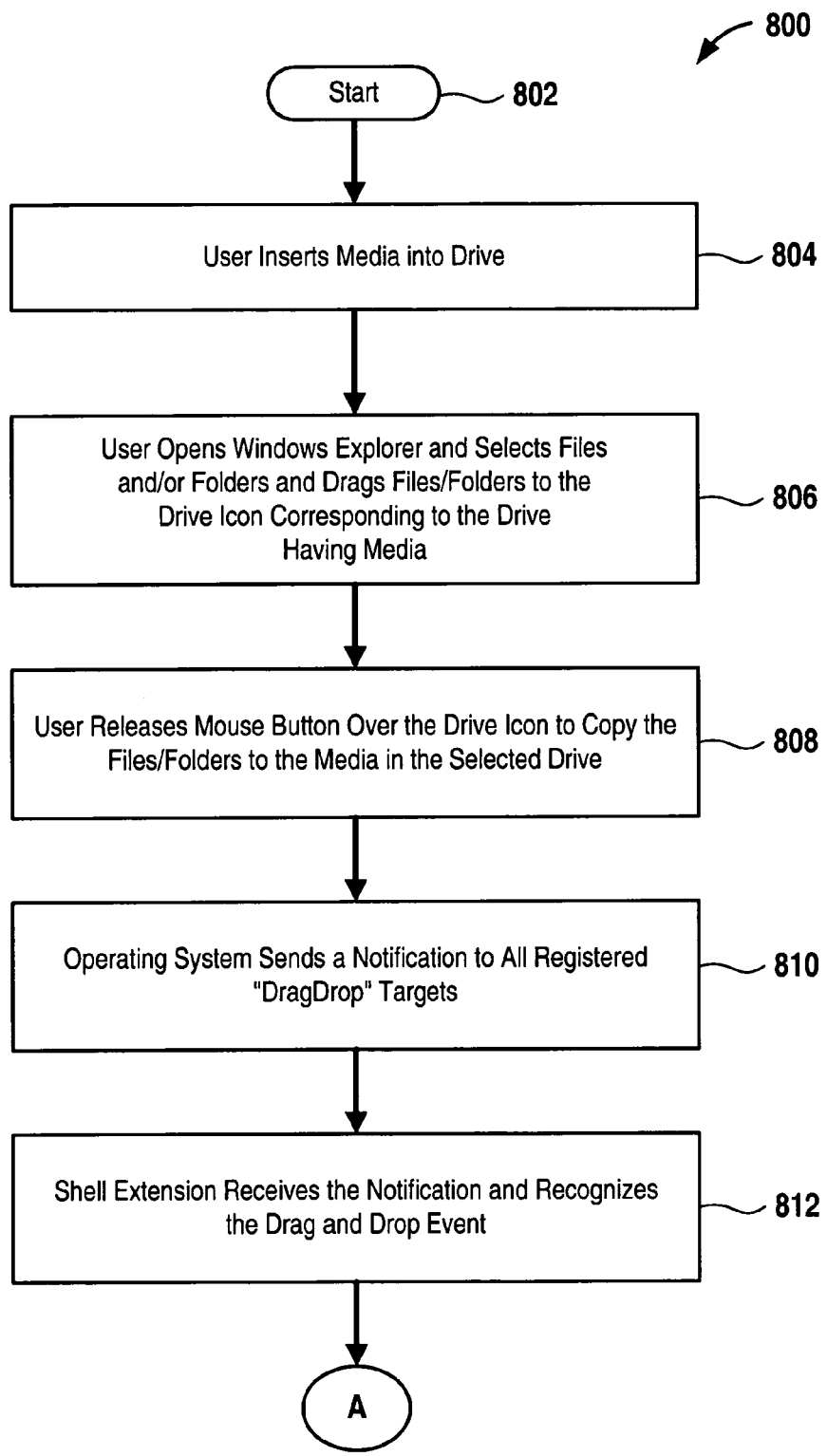
FIGS. 8A and 8B form a flowchart showing a method for automatically formatting removable media at an application level, in accordance with an embodiment of the present invention.
Figure 8B:
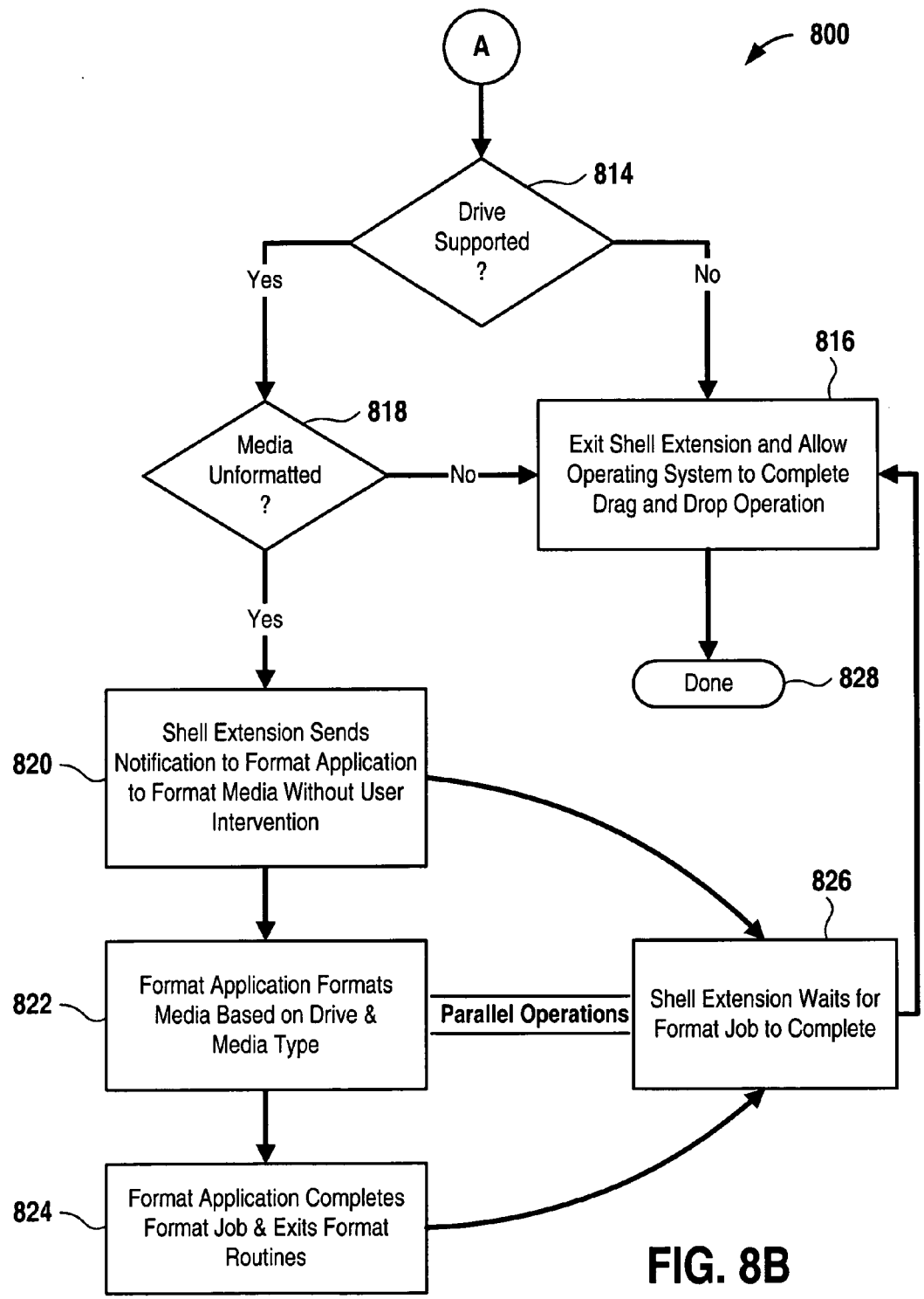

FIGS. 8A and 8B form a flowchart showing a method 800 for automatically formatting removable media at an application level, in accordance with an embodiment of the present invention. Although the following description is in terms of the Windows Explorer® program, it should be noted that other techniques for writing a file to removable media exist, which are dependent on the operating system environment utilized by the computer system. As such, it should be appreciated that the embodiments of the present can be utilized in conjunction with any technique utilized to interact with removable media.

In an initial operation 802, preprocess operations are performed. Preprocess operations can include, for example, registering the shell extension with the operating system, detecting the type and capabilities of the available system hardware, and other preprocess operations that will be apparent to those skilled in the art after a careful reading of the present disclosure.

The user inserts the media into the drive, in operation 804. The media can be any removable media, such as a CD, DVD, floppy disk, or CD-R/RW. As mentioned previously, when removable media, such as an optical disc, is inserted into a removable media drive, the operating system is notified that new media is present in the drive. The operating system then typically notifies applications that there is new removable media in a drive. Applications interested in such an event, for example a Windows® shell application, query the operating system for the details of the new media. In response, the operating system queries the high level drivers for information on the new media.

In operation 806, the user opens Windows Explorer® and files and/or folders and drags the files and/or folders to a drive icon corresponding to the drive having the removable media. When using a Windows Explorer® program, for example, the user generally selects a folder having the file from a list of folders displayed in a left frame of the Windows Explorer® user interface. The contents of the selected folder are then displayed in a right frame of the Windows Explorer® user interface. The user can "drag" the icon representing the file from the right frame to the desired media drive icon in the left frame to save the file.

The user then releases the mouse button over the drive icon to copy the files to the drive, in operation 808. When "dragging" the file to a drive icon, the user selects a file to save to the media using the mouse cursor, as described above. Then, to save the file to the media, the user drags the icon representing the file to the drive icon and releases the mouse button.

In response, the operating system sends a notification to all registered "DragDrop" handlers, in operation 810. In a computer system, multiple applications can be registered with the operating system to receive notification of Drag and Drop operations. For example, anti-virus software often is notified of Drag and Drop operations so the software can examine the file for potential viruses prior to allowing the file to be written to the media. Generally speaking, whenever a Drag and Drop operation occurs in the computer system, the operating system uses the system registry to determine which applications are registered as "DragDrop" handlers. These applications are then notified of the current Drag and Drop operation.

In operation 812, the shell extension receives the notification and recognizes the Drag and Drop event. As mentioned above, embodiments of the present invention create a shell extension, which functions as an extension to the Windows Explorer® program. The shell extension allows operations occurring in Windows Explorer® to be intercepted and acted on in a particular manner. By registering the shell extension as a DragDrop handler in the Windows® registry, the shell extension gets notifications for Drag and Drop operations and Cut and Paste operations to particular drives that are performed using Windows Explorer®. The method 800 then continues to pointer A of FIG. 8B.

Continuing from pointer A on FIG. 8B, a decision is made as to whether target drive of the Drag and Drop operation is a drive supported by the shell extension, in operation 814. Although the embodiments of the present invention can support any of the plurality of media drives included in a particular computer system, embodiments of the present invention are not required to support all the drives on the computer system. For example, since hard drives are infrequently formatted, a user can configure the shell extension and related formatting application to support floppy and CDRW drives, but not support hard disk drives. In one embodiment, the exact configuration of which drives to support is at the discretion of the individual user and depends on the particular user's needs. However, it should be noted that the application can determine which drives can be autoformatted based on whether a particular drive supports the media type for which a particular application is designed. For example, if the application is designed for use with optical media, the application can set all drives that support optical media as being supported for autoformatting. Hence, if the target drive of the Drag and Drop operation is a supported drive, the method 800 continues to operation 818 where the format state of the media is determined. However, if the target drive of the Drag and Drop operation is not a supported drive, the Drag and Drop operation is passed to the operating system, in operation 816.

In operation 816, the shell extension handler is exited and the operating system is allowed to complete the Drag and Drop operation. As mentioned above, in one embodiment the shell extension is a dynamic link library that runs in conjunction with the operating system. The shell extension handler is a function within the shell extension that handles Drag and Drop operations. In operation 816, the shell extension handler is no longer needed, and thus is exited. In addition, the Drag and Drop operation is passed to operating system, which completes the Drag and Drop operation in a normal manner.

In operation 818, a decision is made as to whether the media in the target drive is unformatted. Embodiments of the present invention automatically format removable media prior to write operations to that media. Hence, if the target drive is determined to be a supported drive in operation 814, and the media in the target drive is unformatted, the method 800 continues to operation 820. Otherwise, the method 800 branches to operation 816, where the Drag and Drop operation is passed to the operating system as described above.

In operation 820, the shell extension sends a notification to the format application to format the media without user intervention. As mentioned above, the format application of the embodiments of the present invention is capable of formatting media in a plurality of manners. For example, the format application can format media with user intervention, based on specific commands from the user, thus requiring the user to make a number of configuration decisions. In addition, the format application can format media without user intervention, wherein in one embodiment, the application makes the format configuration decisions and optionally formats the media in the fastest manner currently available. From operation 820, the method 800 branches into two parallel processes in operations 822 and 826.

The format application determines the drive type and media type, and formats the media appropriately, in operation 822. In response to receiving the format notification from the shell extension, the format application begins a new format job by determining the drive type and media type. The application chooses an appropriate format type based on the determined drive type and media type, and proceeds to format the media. After formatting the media, the format application completes the format job and exists the format routines, in operation 824.

While operation 822 is being performed, the shell extension waits for the format job to complete, in operation 826. Thus, in operation 826, the shell extension waits for the format of the media to happen. Once the format application completes the format job, the shell extension exists the shell extension handlers and allows the operating system to complete the Drag and Drop operation, in operation 818 described above.

Figure 9A:
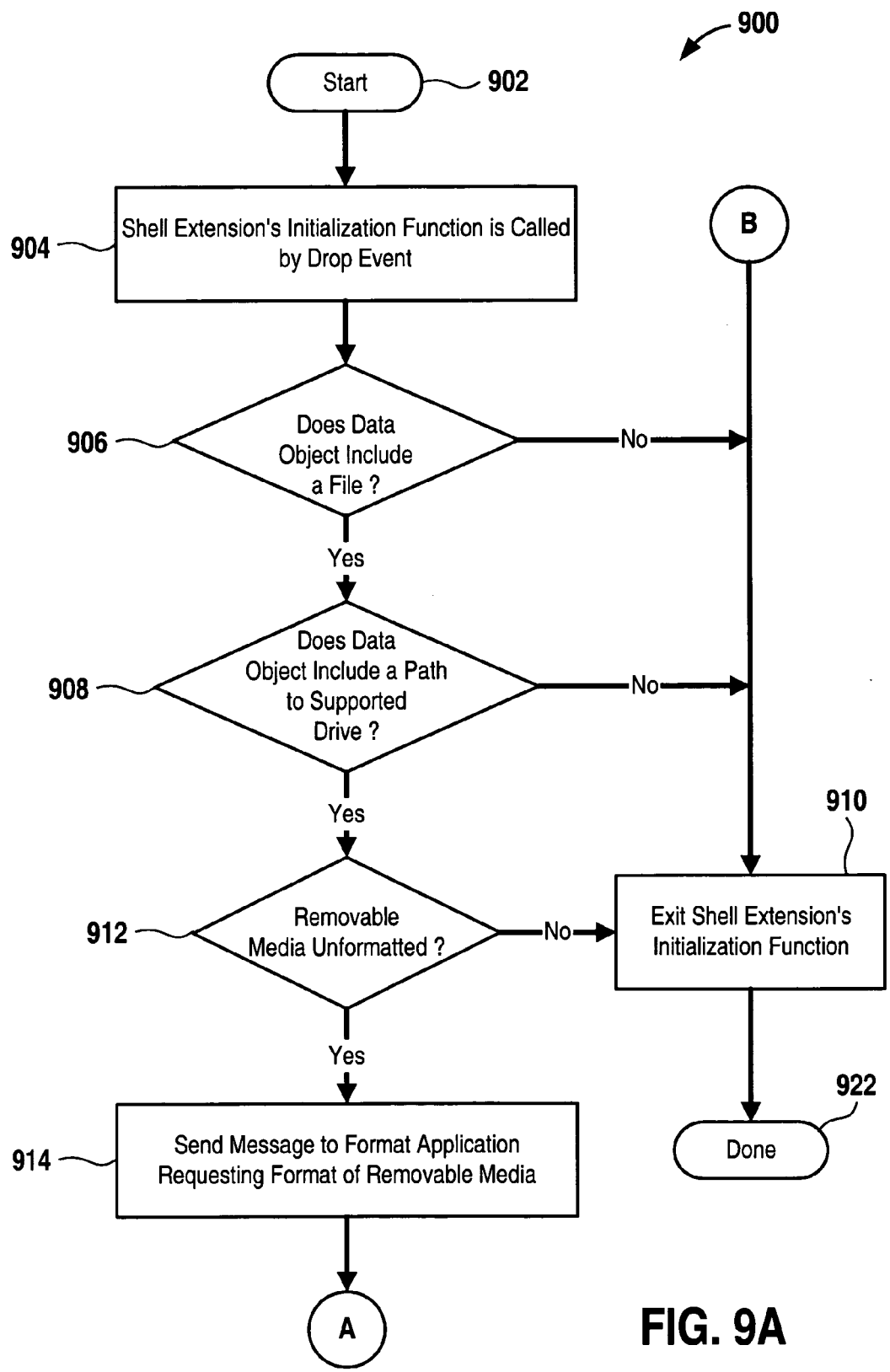
FIGS. 9A and 9B form a flowchart showing a method for responding to a Drag and Drop command using a shell extension, in accordance with an embodiment of the present invention.
Figure 9B:
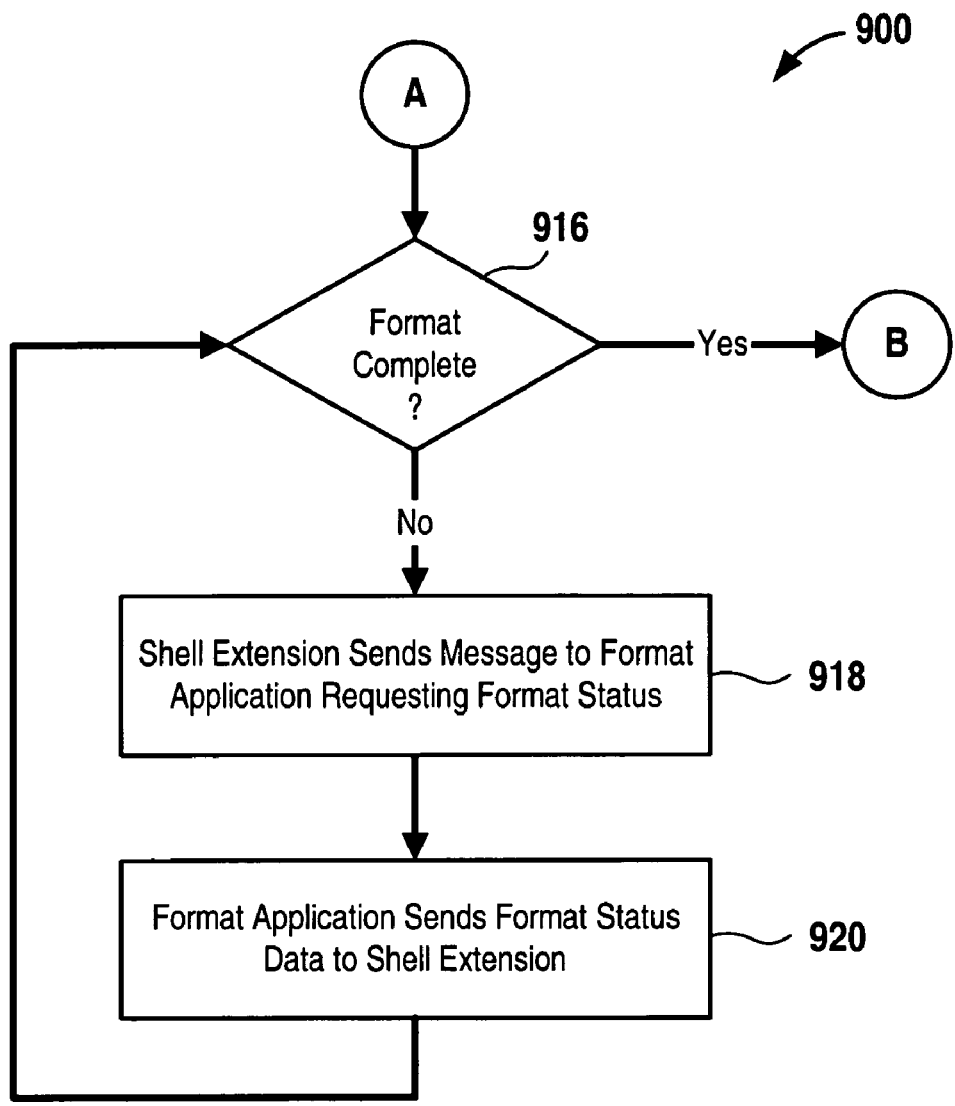

FIGS. 9A and 9B form a flowchart showing a method 900 for responding to a Drag and Drop command using a shell extension, in accordance with an embodiment of the present invention. In an initial operation 902, preprocess operations are performed. Preprocess operations can include, for example, registering the shell extension as a DragDrop handler with the operating system registry, receiving a drop notification from the operating system, and other preprocess operations that will be apparent to those skilled in the art.

In operation 904, the Drop event calls the shell extension's initialize function. A plurality of interfaces is exposed to the operating system during execution, each indicating a location for a particular function call. In order for the operating system to locate each interface, a common function name is utilized for each type of interface. One of these interfaces is the shell extension's initialize function, which is a setup function for the shell extension of the embodiments of the present invention. Thus, when a Drop operation occurs, the operating system calls the shell extension's initialize function to start and initialize the shell extension.

A decision is then made as to whether a data object passed in the initialization function call includes at least one file, in operation 906. The call to the initialize function includes a data object that provides specific information regarding the particular Drop operation. More particularly, in the case of a Drop operation, the data object includes a list of files involved in the Drop operation. If the data object includes at least one file, the method 900 continues to operation 908. However, in certain circumstances, the data object may not include any files, such as when the user attempts to obtain a 'properties' page on a drive. In this case, the shell extension's initialization function will still be called, however, the passed data object is empty because the operation is not a file operation. Hence, if the data object does not include at least one file, the method 900 branches to operation 910, where the shell extension's initialization function exits.

In operation 908, a decision is made as to whether the data object includes a path to a drive supported by the shell extension. The data object includes a list of items regarding the Drop operation. One of these items is a path to the target drive of the Drop operation. In operation 908, the shell extension examines the path to the target drive in the data object to determine whether the target drive of the Drop operation is a drive currently supported by the shell extension format application. If the data object includes a path to a drive supported by the shell extension, the method 900 continues with operation 912. Otherwise, the method 900 branches to operation 910, where the shell extension's initialization function exits. That is, when the target drive is not a supported drive, the shell extension exits and allows the operating system to continue with the Drop operation in a normal manner.

In operation 912, a decision is made as to whether the removable media is unformatted. As mentioned above, embodiments of the present invention automatically format removable media prior to write operations to that media. Hence, if the target drive is determined to be a supported drive in operation 908, and the media in the target drive is unformatted, the method 900 continues to operation 914. Otherwise, the method 900 branches to operation 910, where the shell extension exits and the Drag and Drop operation is passed to the operating system as described above.

A message is then sent to the format application requesting the format application to format the removable media, in operation 914. Once a disk write operation, such as a Drag and Drop operation, has been intercepted by the shell extension for a supported drive, the shell extension calls the format application. The format application examines the removable media to determine whether the removable media is completely erased or unformatted. Completely erased removable media may have been previously formatted, and erased or may have 'zeros' written to the entire media, depending on the erase capabilities of the drive type and media. It should be noted that unformatted removable media in some cases is different from removable media that has been completely erased. Optionally, the shell extension can analyze the removable media itself to determine the format state using internal library functions, instead of calling the format application.

At this point, the format application begins formatting the removable media. In one embodiment, while the format application formats the media, the shell extension polls the format application to determine when the format operation is complete. In particular, from pointer A of FIG. 9B, the shell extension determines whether the format is complete based on information received from the format application, in operation 916. If the shell extension determines that the format is incomplete, the method 900 continues to operation 918. Otherwise, the method 900 proceeds to pointer B and then to operation 910 of FIG. 9A, where the shell extension exits and the operating system proceeds with the Drag and Drop operation in a normal manner.

Optionally, the shell extension can wait for the disk to be mounted, which indicates the removable media is formatted. Before an operating system can utilize removable media, the operating system generally mounts the removable media. To mount the removable media, the removable media is examined to obtain structures that are needed to find files and folders stored on the removable media. Hence, in this embodiment, operations 918 and 920 are a voided. Instead, when the disk can be mounted, the shell extension knows the removable media has been formatted because the required structures will be present on the formatted media. Thus, when the disk can be mounted, the method 900 proceeds to operation 910, where the shell extension's initialization function exits and the Drop operation is passed to the operating system for further processing.

In operation 918, the shell extension sends a message to the format application requesting status of the format operation. As described above, at this point the format application begins formatting the removable media. Periodically, the shell extension queries the format application for status. In response, in operation 920, the format application sends status information to the shell extension. The status information can include a progress report on the format operation and can further indicate when the format operation is complete. Once the shell extension receives and interprets the status information received from the format application, the method 900 continues back to operation 916, where the shell extension determines whether the format is complete based on the status information received from the format application. From operation 910, the method 900 completes and post-process operations are performed in operation 922.

Figure 10:
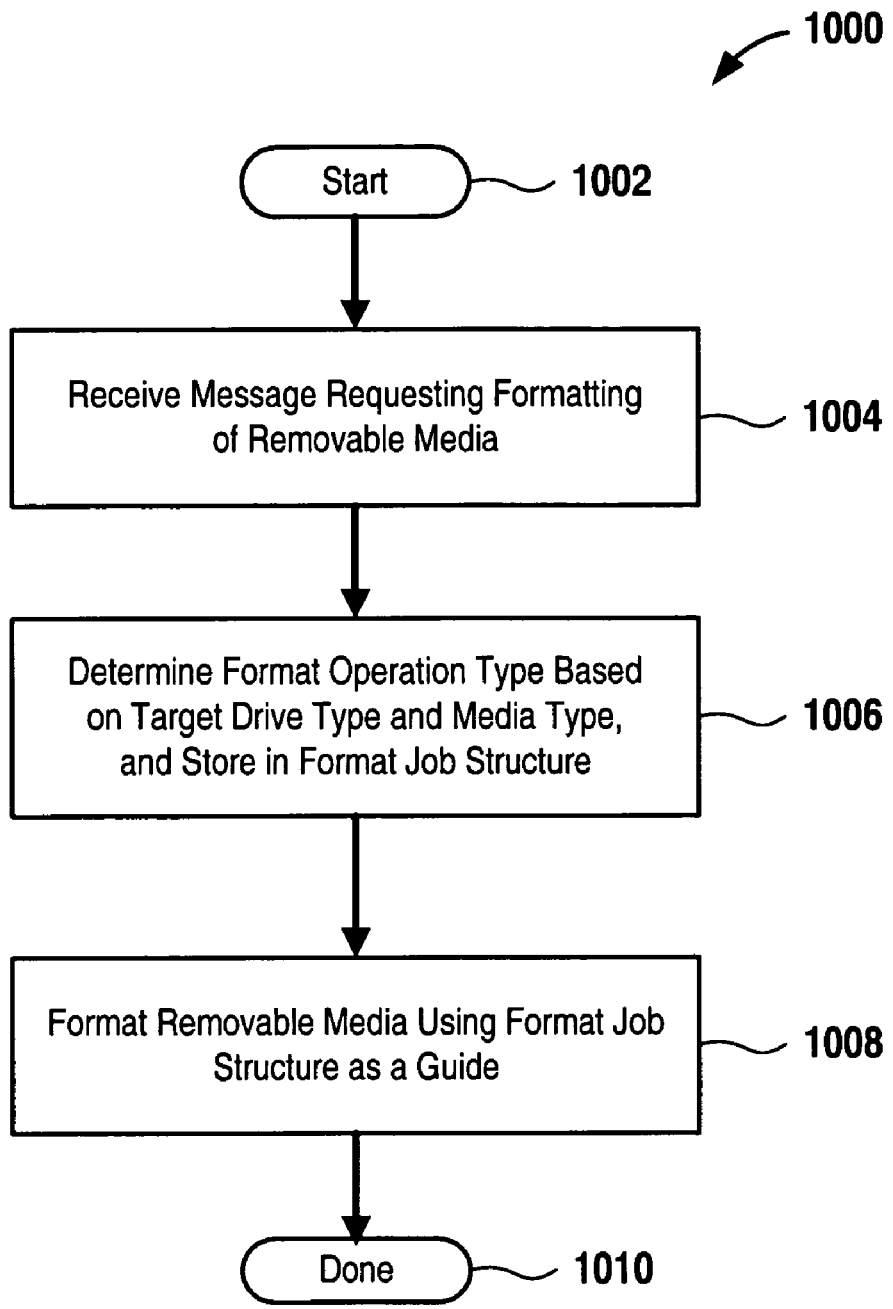
FIG. 10 is flowchart showing a format method for formatting removable media using a format application, in accordance with an embodiment of the present invention.

FIG. 10 is flowchart showing a format method 1000 for formatting removable media using a format application, in accordance with an embodiment of the present invention. In operation 1002, preprocess operations are performed. Preprocess operations can include, for example, intercepting a Drag and Drop command, determining whether the command corresponds to a supported drive, determining whether removable media within the target drive is formatted or unformatted, and other preprocess operations that will be apparent to those skilled in the art after a careful reading of the present disclosure.

In operation 1004, a message is received by the format application requesting formatting of removable media without user interaction. As mentioned above, embodiments of the present invention allow users to utilize removable media in a straight forward manner, regardless of whether the removable media is formatted or unformatted. When unformatted, as described in greater detail previously, a shell extension intercepts a media modifying command, such as a write command, and checks whether the target removable media is formatted or unformatted. If the removable media is unformatted, the shell extension sends a message to the format application requesting formatting of removable media without user interaction.

In response, in operation 1006, the format application determines the format operation type based on the target drive type and the media type (and optionally the type of files being written). In one embodiment a format job structure is utilized to store and retrieve specific information regarding a particular format operation. The format job structure includes data regarding what type of media is being formatted and how the media should be formatted. Hence, in operation 1006, the format application examines the drive type, the media type, and the context wherein the format message was received, and fills in the format job structure accordingly. The format job structure is then provided to the actual format subroutine, as described in greater detail below.

The removable media is then formatted using the format job structure as a guide, in operation 1008. As mentioned above, the format job structure includes relevant data for performing a particular format operation. The format subroutine uses the format job structure to determine what type of format operation to utilize when formatting the removable media. For example, the format job structure can indicate whether a "fastformat" operation should be used, or whether Mount Rainier (EasyWrite) formatting should be used. Based on the data stored in the format job structure, the format subroutine formats the removable media.

Post process operations are performed in operation 1010. Post process operations can include, for example, sending status information to the shell extension to indicate format job progress, and other post process operations that will be apparent to those skilled in the art after a careful reading of the present disclosure. In this manner, embodiments of the present invention allow a user to utilize unformatted removable media in a manner similar to formatted media. In addition, the format application of the embodiments of the present invention can perform format operations both with user interaction or without user interaction, thus being transparent to the user.

Figure 11:
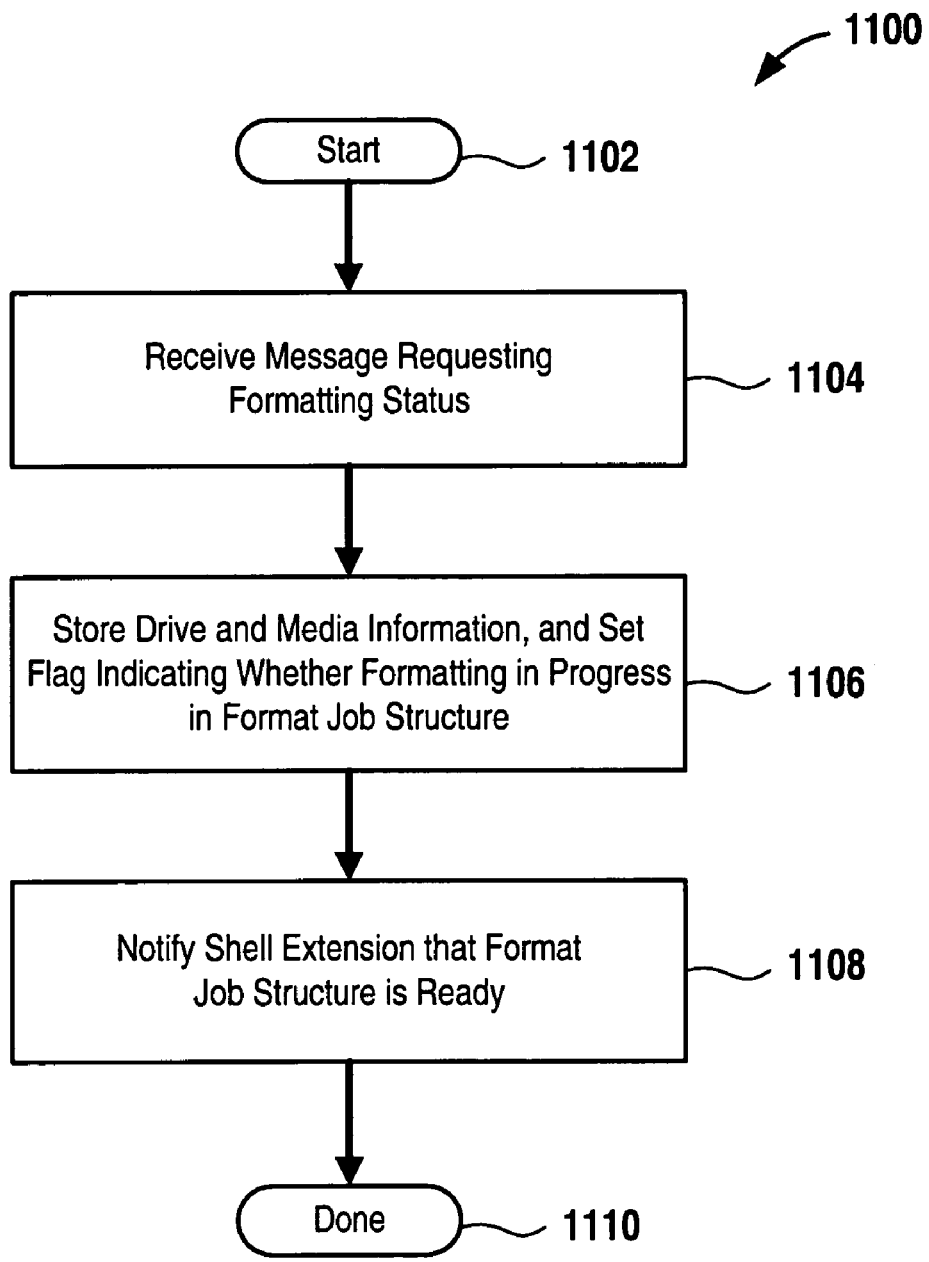
FIG. 11 is flowchart showing a format method for passing information between the format application and the shell extension, in accordance with an embodiment of the present invention.

FIG. 11 is flowchart showing a format method 1100 for passing information between the format application and the shell extension, in accordance with an embodiment of the present invention. In operation 1102, preprocess operations are performed. Preprocess operations can include, for example, intercepting a Drag and Drop command, determining whether removable media within the target drive is formatted or unformatted, starting a format operation on the removable media, and other preprocess operations that will be apparent to those skilled in the art after a careful reading of the present disclosure.

In operation 1104, a message is received by the format application requesting formatting status. As stated above, during a format operation, one embodiment of the present invention queries the format application to determine whether the format operation is complete. To do this, the shell extension sends a message to the format application requesting format status.

In response, in operation 1106, the format application stores drive and media data, and sets a flag indicating whether formatting is currently in progress, in the format job structure. This structure can then be provided to the shell extension, which can read the format job structure to acquire information regarding the format operation, media, and drive.

Once the format job structure is ready, the format application notifies the shell extension, in operation 1108. In this manner, the shell extension can examine the format job structure to obtain needed information. Post process operations are then performed in operation 1110. Post process operations can include, for example, determining when a format operation is complete based on the data stored in the format job structure, allowing the operating system to continue processing the remainder of a Drop request, such as copying files to the media, and other post process operations that will be apparent to those skilled in the art after a careful reading of the present disclosure.

As can be appreciated, method 1100 allows the format application to provide additional information to the shell extension during a format process. Moreover, the information provided can be changed based on the needs of a particular user or implementation. For example, the amount of time left for completion of the format process can be provided, or detailed format failure information can be provided to the shell extension if the format operation fails.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method for automatically formatting removable media, comprising the operations of:
    intercepting a write request to write to removable media, wherein the write request is preserved by a shell extension;
    determining whether the write request is directed to a supported drive;
    if the write request is directed to the supported drive, determining if the removable media is unformatted;
    if the write request is directed to the supported drive, automatically preparing the removable media for content when the removable media is unformatted based on at least determining a drive type of a drive containing the removable media, and detecting a media type of the removable media present in the drive, wherein the removable media is prepared for content without user interaction, and wherein the preparing of the removable media for content without user interaction is associated with the preparing of the removable media for content;
    if the write request is directed to the supported drive, providing the write request that was preserved by the shell extension to an operating system, wherein the operating system performs a write operation on the removable media; and
    if the write request is not directed to the supported drive, providing the write request that was preserved by the shell extension to an operating system without determining if the removable media is unformatted and without automatically preparing the removable media for content, wherein the operating system performs the write operation on the removable media.

2. A method as recited in claim 1, wherein the supported drive is a drive within a predetermined set of supported drives.

3. A method as recited in claim 1, further comprising the operation of sending a message to a format application requesting the format application format the removable media when the removable media is unformatted.

4. A method as recited in claim 1, wherein the drive type defines characteristics of the drive.

5. A method as recited in claim 1, wherein the media type defines characteristics of the removable media.

6. A method as recited in claim 5, wherein the removable media is prepared for content based on the drive type and media type in response to receiving a request to write to the removable media.

7. A method as recited in claim 1, wherein the removable media is a compact disc.

8. A method as recited in claim 1, wherein the removable media is a digital videodisc.

9. A method as recited in claim 1, wherein the removable media is a floppy disk.

10. A computer system for automatically formatting removable media, comprising:
   a format application executed by the computer, the format application capable of automatically preparing removable media for content based on at least a drive type defining characteristics of a drive containing the removable media, and a media type defining characteristics of the removable media, wherein the removable media is prepared for content without user interaction and wherein the preparing of the removable media for content without user interaction is associated with the preparing of the removable media for content; and
   a shell extension executed by the computer, wherein the shell extension is in communication with the format application, the shell extension capable of intercepting a write request and preserving the write request to write to the removable media, the shell extension is capable of determining if the removable media is unformatted, wherein the shell extension sends a format message requesting the format application prepare the removable media for content if the removable media is unformatted.

11. A system as recited in claim 10, wherein the shell extension provides the write request to an operating system once the removable media is prepared for content, the operating system performing a write operation on the removable media based on the write request.

12. A system as recited in claim 10, wherein the shell extension is capable of determining whether the write request is directed to a supported drive, the supported drive being a drive within a predetermined set of supported drives.

13. A system as recited in claim 12, wherein the shell extension provides the write request to the operating system without sending the format message to the format application if the write request is not directed to a supported drive.

14. A computer program embodied on a computer readable medium, the computer program capable of automatically formatting removable media, comprising:
   program instructions for intercepting a write request to write to removable media, wherein the write request is preserved by a shell extension;
   program instructions for, determining whether the write request is directed to a supported drive;
   program instructions for, if the write request is directed to the supported drive, determining if the removable media is unformatted;
   program instructions for, if the write request is directed to the supported drive, automatically preparing the removable media for content when the removable media is unformatted without user interaction, wherein preparing the removable media for content is based on at least a drive type defining characteristics of a drive containing the removable media, and a media type defining characteristics of the removable media, and wherein the preparing of the removable media for content without user interaction is associated with the preparing of the removable media for content;
   program instructions that, if the write request is directed to the supported drive, provide the write request preserved by the shell extension to an operating system, the operating system performing a write operation on the removable media; and
   program instructions that, if the write request is not directed to the supported drive, provide the write request preserved by the shell extension to an operating system without determining if the removable media is unformatted and without automatically preparing the removable media for content, wherein the operating system performs the write operation on the removable media.

15. A computer program as recited in claim 14, wherein the supported drive is a drive within a predetermined set of supported drives.

16. A computer program as recited in claim 14, further comprising program instructions that send a message to a format application requesting the format application format the removable media when the removable media is unformatted.

* * * * *